US011992452B2

(12) United States Patent
Spalletta

(10) Patent No.: US 11,992,452 B2
(45) Date of Patent: May 28, 2024

(54) DEVICE FOR THE NON-INVASIVE TREATMENT OF MUSCULAR AND NEUROMUSCULAR PATHOLOGIES AND SUPPORT TO AESTHETIC TREATMENTS

(71) Applicant: AD SWISS MEDTECH SA, Gravesano (CH)

(72) Inventor: Filippo Spalletta, Lamone (CH)

(73) Assignee: AD SWISS MEDTECH SA, Gravesano (CH)

( * ) Notice: Subject to any disclaimer, the term of this patent is extended or adjusted under 35 U.S.C. 154(b) by 837 days.

(21) Appl. No.: 17/044,042

(22) PCT Filed: Apr. 4, 2019

(86) PCT No.: PCT/IB2019/052751
§ 371 (c)(1),
(2) Date: Sep. 30, 2020

(87) PCT Pub. No.: WO2019/193525
PCT Pub. Date: Oct. 10, 2019

(65) Prior Publication Data

US 2021/0093504 A1 Apr. 1, 2021

(30) Foreign Application Priority Data

Apr. 5, 2018 (IT) ........................ 102018000004224

(51) Int. Cl.
*A61H 23/04* (2006.01)

(52) U.S. Cl.
CPC ..... *A61H 23/04* (2013.01); *A61H 2201/0153* (2013.01); *A61H 2201/1409* (2013.01)

(58) Field of Classification Search
CPC ............ A61H 23/04; A61H 2201/0153; A61H 2201/1409; A61H 2201/5002; A61H 9/0071; A61H 23/0236; A61H 2201/5056; A61H 2201/5053; A61H 9/0078; A61H 23/008; A61H 23/0218
See application file for complete search history.

(56) References Cited

U.S. PATENT DOCUMENTS

| | | | | |
|---|---|---|---|---|
| 2,345,073 | A | 3/1944 | Rosett | |
| 5,233,974 | A | 8/1993 | Senoue | |
| 5,593,381 | A | 1/1997 | Tannenbaum et al. | |
| 6,694,976 | B1 | 2/2004 | Takaki | |
| 2007/0260159 | A1* | 11/2007 | Cagle | A61H 7/008 601/19 |
| 2012/0172772 | A1 | 7/2012 | Guantera et al. | |
| 2015/0173996 | A1* | 6/2015 | Grez | A61M 5/425 600/587 |
| 2018/0153763 | A1* | 6/2018 | Tseng | A61H 11/00 |

FOREIGN PATENT DOCUMENTS

| | | |
|---|---|---|
| WO | 0206673 | 1/2002 |

OTHER PUBLICATIONS

International search report and written opinion dated Sep. 17, 2019 for corresponding PCT application No. PCT/IB2019/052751.
Office Action issued by the KR Patent Office on Jan. 9, 2024 for Korean patent application No. 10-2020-7031650.

* cited by examiner

*Primary Examiner* — Justine R Yu
*Assistant Examiner* — Matthew R Moon

(57) ABSTRACT

A device for the non-invasive treatment of muscular and neuromuscular pathologies by applying a succession of mechanical-sound waves to a muscle.

27 Claims, 9 Drawing Sheets

DEVICE FOR THE NON-INVASIVE TREATMENT OF MUSCULAR AND NEUROMUSCULAR PATHOLOGIES AND SUPPORT TO AESTHETIC TREATMENTS

This application is a U.S. national stage of PCT/IB2019/052751 filed on 4 Apr. 2019, which claims priority to and the benefit of Italian Application No. 102018000004224 filed on 5 Apr. 2018 the contents of which are incorporated herein by reference in their entireties.

The object of the present invention concerns a device for the treatment of muscular and neuromuscular pathologies and support to aesthetic treatments.

In particular, the object of the present invention concerns a device for the treatment of muscular and neuromuscular pathologies by applying a succession of mechanical-sound waves to one or more muscles.

More in particular, the device of the present invention is such as to produce mechanical-sound waves or vibrations able to induce adaptive responses of the metabolic and neurophysiological types in the neuromuscular chain and in the osteoarticular structures of a patient by interacting with the cortical areas and cerebellum.

In the known art, there are devices for the non-invasive treatment of muscular and neuromuscular pathologies which are generally used for some applications on specific muscular and/or epidermal regions of the patient, but not on all anatomic regions theoretically treatable with such therapeutic technique. By way of example, a device for the non-invasive treatment of muscular pathologies of the known type is described in document EP1824439.

In fact, the therapeutic treatment devices of the known type have actuators made to be able to satisfy different therapeutic requirements in terms of anatomic regions treatable with the technique in question. In particular, for each anatomic region to be treated, there is a specific actuator of adequate shape and size, especially with a ratio between surfaces and holes dispensing the impulses calibrated according to the type of impact the latter must have on the epidermis.

In the known art, the therapeutic treatment devices of the known type have an impulse/vibration generator of the membrane type, which requires a connection to a pressurized area and to a low-pressure area of a compressor.

The structural configuration of the treatment devices of the traditional type in fact has some limitations and drawbacks.

A first limitation lies in the fact that the device of the known type is very costly in terms of the number of actuators it must have for as many anatomical regions to be treated. In other words, the more anatomic regions of a patients have to be treated, the greater the number of actuators that the technician must have in order to use the therapeutic treatment device of the known type.

A second limitation lies in the fact that the therapeutic treatment device of the known type is able to reach a mechanical-sound wave frequency which cannot exceed 300 Hz.

Moreover, the means generating vibrations/mechanical-sound waves have an operating structure with a pneumatic membrane whose elastic characteristics are subject to wear and deterioration over time and use. This typical characteristic of the devices of the known type considerably limits the amount of air which the flow modulator could manage. In fact, the device of the known type cannot deliver compressed air beyond a certain flow rate and/or pressure and is not able, as mentioned above, to exceed a given vibration frequency.

A third further limitation of the therapeutic devices of the known type is the considerable vibration of the transmission means and of the dispensing means, also named actuators. Sometimes, excessive vibrations from the device to the actuator lead to the breakage of the transmission means of the mechanical-sound waves. A consequence is that the therapeutic treatment must be resumed and restored with an inevitable loss of time for the assigned operator and patient.

A further disadvantage of the devices of the known type is the fact that the vibrations, as mentioned above, also involve the diffusion of acoustic waves, i.e. of noise generated by the device itself.

In addition, the devices of the known type allow to dispense mechanical-sound waves to patients who substantially have to remain motionless such as not to alter the treatment through, for example, the involuntary displacement of the actuators on the epidermis. Moreover, as a consequence of the fact that the pneumatic connections between the actuators and transmission means of the mechanical-sound waves in the devices of the known type are delicate and not very resistant, an involuntary movement of the patient could cause a tube of impulse transmission to come out and/or the breakage of the pneumatic connector itself.

The description of the present invention is provided with reference to the accompanying figures, which also have a purely illustrative and therefore non-limiting purpose, in which.

Figure 5:
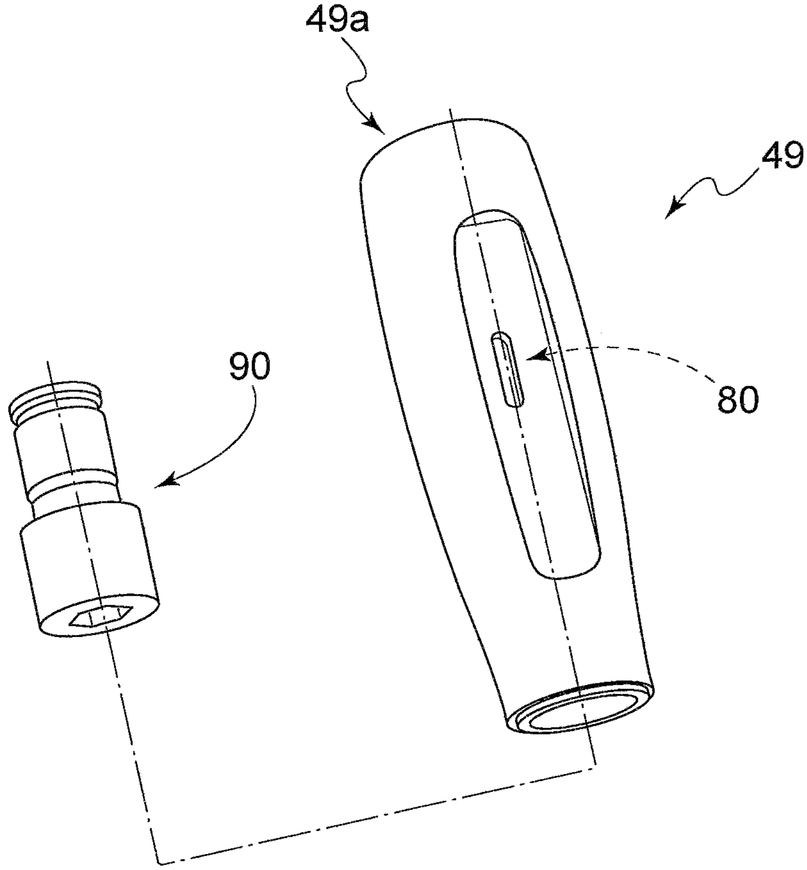
Figure 10:
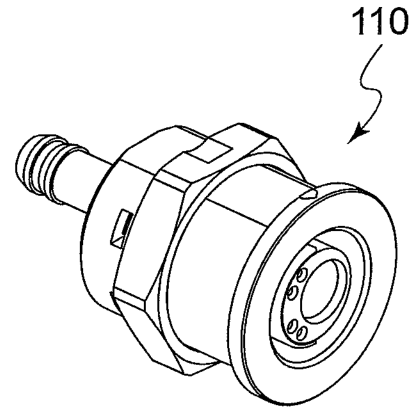
Figure 11:
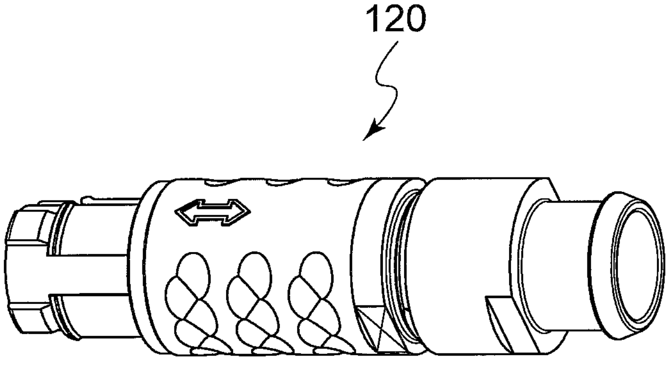

FIG. 5 schematically is an exploded view of a handgrip of at least one actuator according to the present invention;

FIGS. 6-9C are perspective views of components of the device according to the present invention;

FIG. 10 is a schematic view of a component of the quick coupling type of the device of the present invention;

FIG. 11 is a schematic view of a further component similar to the one of FIG. 10.

The present invention concerns a device for producing vibrations of high therapeutic value, able to induce adaptive responses of the metabolic and neurophysiological type in the neuromuscular chain and in the myo-osteoarticular structures of a patient by interacting with the cortical areas and cerebellum.

In other words, the present invention concerns a device for the non-invasive treatment of muscular and neuromuscular pathologies by applying a succession of mechanical-sound waves to a muscle, comprising production means of the mechanical-sound waves comprising a flow modulator.

The device of the present invention further comprises application means to apply the mechanical-sound waves on the epidermis at a muscle of a patient. The application means are operatively combined with the production means. In particular, the latter are connected by transmission means configured to transmit the just mechanical-sound waves from the production means to said application means.

For the purpose of the present description, mechanical-sound waves are understood as mechanically generated waves having a specific frequency which can be heard by the human ear, which are apt to exert a pressing-suctioning "vibration" sequence on the applied surface.

According to the present invention, the flow modulator comprises an outer casing inside which a pneumatic chamber is defined and subdivided in a first portion and a second portion.

The flow modulator further comprises a rotor element arranged between the first and second portions of the pneumatic chamber. In an operating configuration of the device, the rotor element is rotatable around a symmetry axis "X" of the pneumatic chamber and has an axisymmetric shape.

In further detail, the rotor element is preferably disc-shaped and has a first order of passages such as to pass through the rotor from an upper surface until reaching a circular perimetric surface. The rotor element comprises a second order of passages such as to pass through the rotor from a lower surface until reaching the circular perimetric surface. Preferably, the first order of passages and the second order of passages alternatively reach the perimetric surface in sequence, as shown by way of example in the accompanying FIGS. 2A-2B.

With reference to the transmission means of the mechanical-sound waves, they comprise at least one pneumatic tube having, on a free end thereof, a quick coupling suitable for being fitted with a respective sealed quick coupling portion of said actuator.

More in detail, the transmission means comprise at least one pneumatic tube having, on a further free end, a quick coupling suitable for being fitted with a respective sealed quick coupling of the flow modulator.

Advantageously, the aforesaid casing comprises a central body and an upper cover that can be coupled so as to define the first portion of the pneumatic chamber and a lower cover that can be coupled to the central body so as to define the second portion of the pneumatic chamber. In particular, in an operative configuration of the device, the rotor element is facing the second portion of the pneumatic chamber.

In detail, the central body of the casing has a housing portion configured to at least partially contain the rotor element in an operating configuration of the device.

In particular, when housed in the housing portion of the central body, the rotor only has the lower surface facing the second portion of the pneumatic chamber. Similarly, the upper portion of the rotor element is in contact and/or anyhow facing a respective surface of the housing portion of the central body.

According to the present invention, the central body has a first plurality of passages so that the first portion of the pneumatic chamber fluidically communicates with the housing portion. More precisely, the central body has a second plurality of passages at said housing portion so that the housing portion itself fluidically communicates with an outer portion of the central body.

According to the present invention, the device has quick couplings of the pneumatic type, preferably at the second plurality of passages on the outer portion of the central body of the flow modulator. The aforesaid sealed quick couplings allow the fluid-tight connection of the transmission means with the production means of the mechanical-sound waves.

Figure 3A:
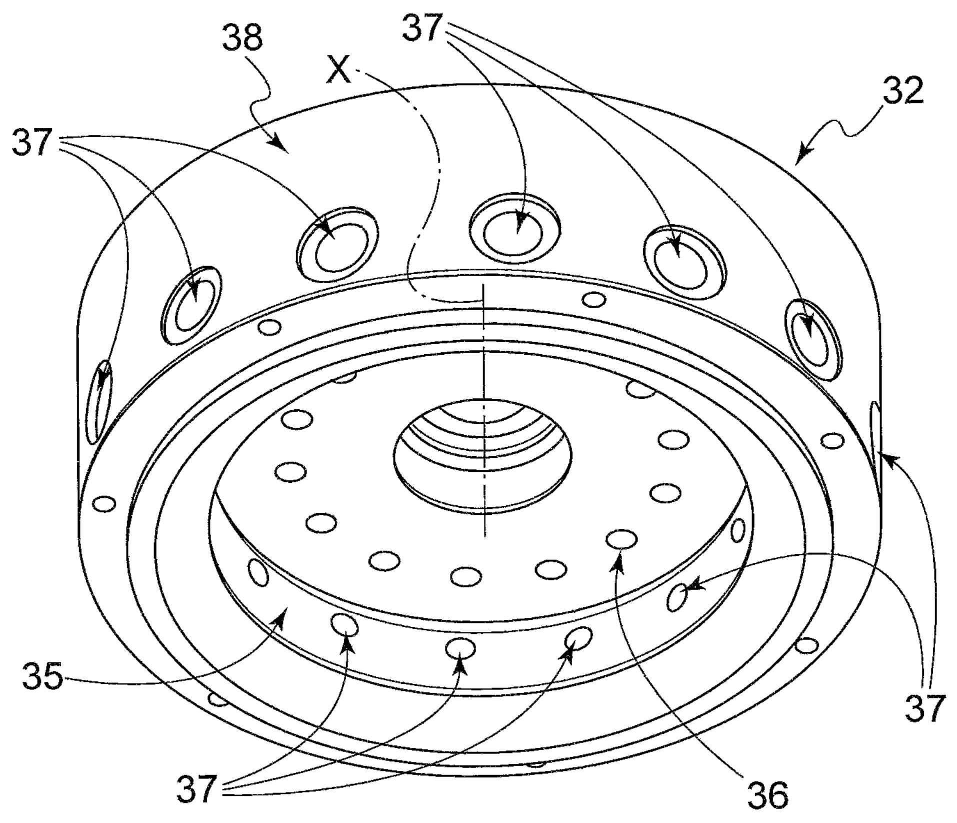
FIG. 3A is a schematic perspective view of the device of the present invention with further hidden parts to better highlight others.
Figure 3B:
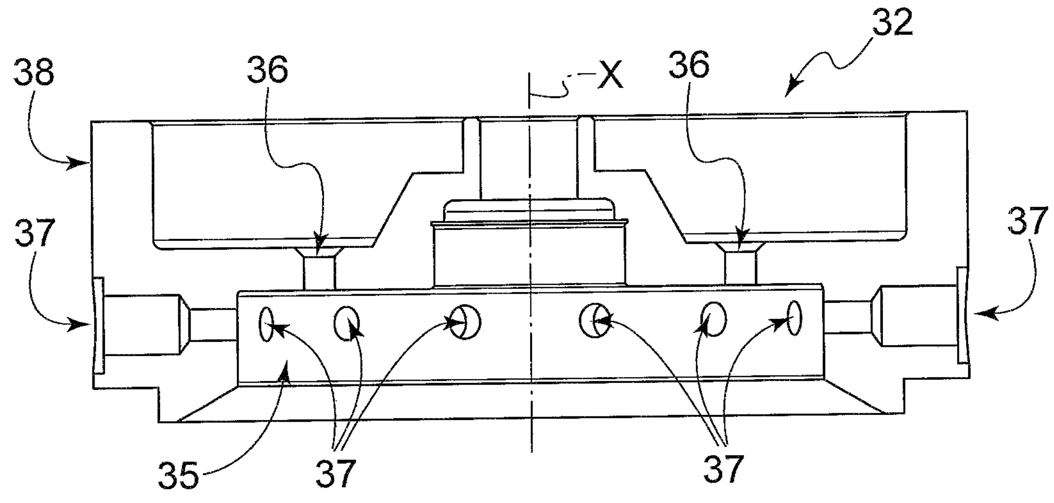
FIG. 3B is a schematic perspective and sectional view of the element of FIG. 3A.

By way of example and not limitedly, the aforesaid central body is schematically depicted in FIGS. 3A-3B.

By means of the characteristics described above, in an operating configuration of the device, therefore when the rotor element is at least partially arranged in the aforesaid housing portion and is rotating, the rotor element itself is such as to selectively and alternatively put the first portion of the pneumatic chamber in fluidic connection with the outer portion of the central body by means of the temporary matching of the first plurality of passages of the central body with the first order of passages of the rotor element.

Contemporaneously to the above, the rotor element is such as to selectively and alternatively put the second portion of the pneumatic chamber in fluidic connection with the outer portion of the central body by means of the temporary matching of the second plurality of passages of the central body with the second order of passages of the rotor element.

Figure 1A:
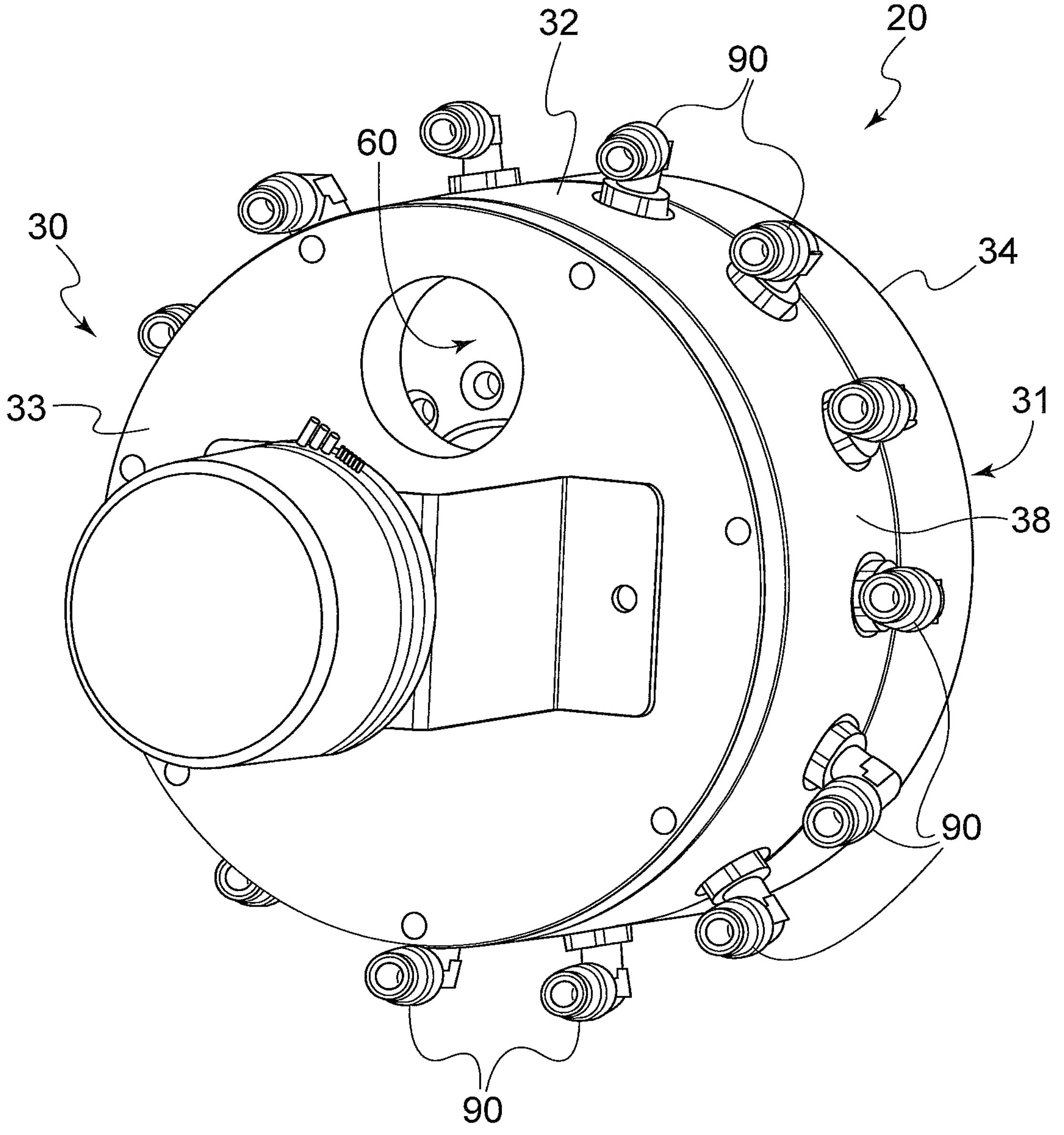
FIG. 1A is a schematic perspective view of the device for the non-invasive treatment of muscular and neuromuscular pathologies according to the present invention with some hidden parts to better highlight others.
Figure 1B:
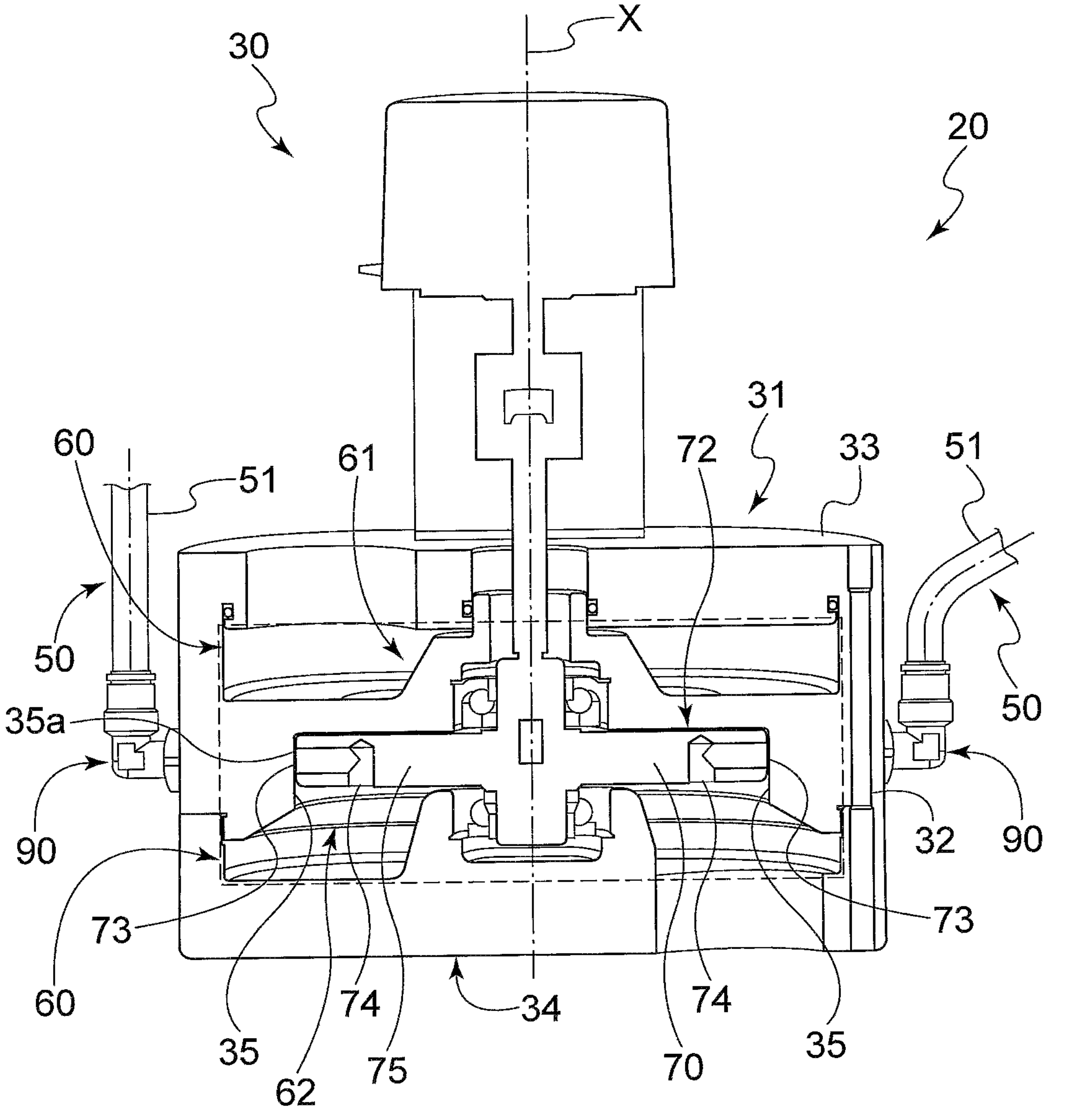
FIG. 1B is a schematic sectional view of the element of FIG. 1A.

With reference to FIG. 1B, the upper surface of the rotor element is facing a respective portion inside the housing portion of the central body. Moreover, the lower surface of the rotor element is facing the second portion of the pneumatic chamber while the aforesaid circular perimetric surface of the rotor element is facing a corresponding part of the housing portion.

According to the present invention, in an operating configuration of the device, the first portion of the pneumatic chamber and the second portion of the pneumatic chamber are governed by different pressure values. Preferably, the pressure difference between the first and second portions of the pneumatic chamber is of about 1 bar, even more preferably such difference does not exceed the value of 1 bar.

The mechanical-sound waves are therefore generated by the flow modulator and in particular by the rotation of the rotor element with respect to the pneumatic chambers.

Conveniently, the device according to the present invention has a control unit to vary the frequency and intensity of the mechanical-sound waves applied to the muscles according to the different type of therapy and/or anatomic portion to be treated.

Preferably, the production means of the mechanical-sound waves generate mechanical-sound waves with frequency greater than 30 Hz.

Conveniently, the production means of the mechanical-sound waves generate selective square-wave mechanical-sound waves.

Advantageously, there is a plurality of application means of the mechanical-sound waves. The plurality of the application means of the mechanical-sound waves contemporaneously applies synchronous mechanical-sound waves to muscles and preferably of equal intensity.

With reference to the application means of the mechanical-sound waves on the epidermis of the present invention, they preferably are distinguished in at least two main categories.

According to the present invention, the application means comprise an actuator shaped like a hemispherical cap. Preferably, the aforesaid hemispherical actuator is configured for an application to the muscle and/or epidermis of a patient.

Figure 4A:
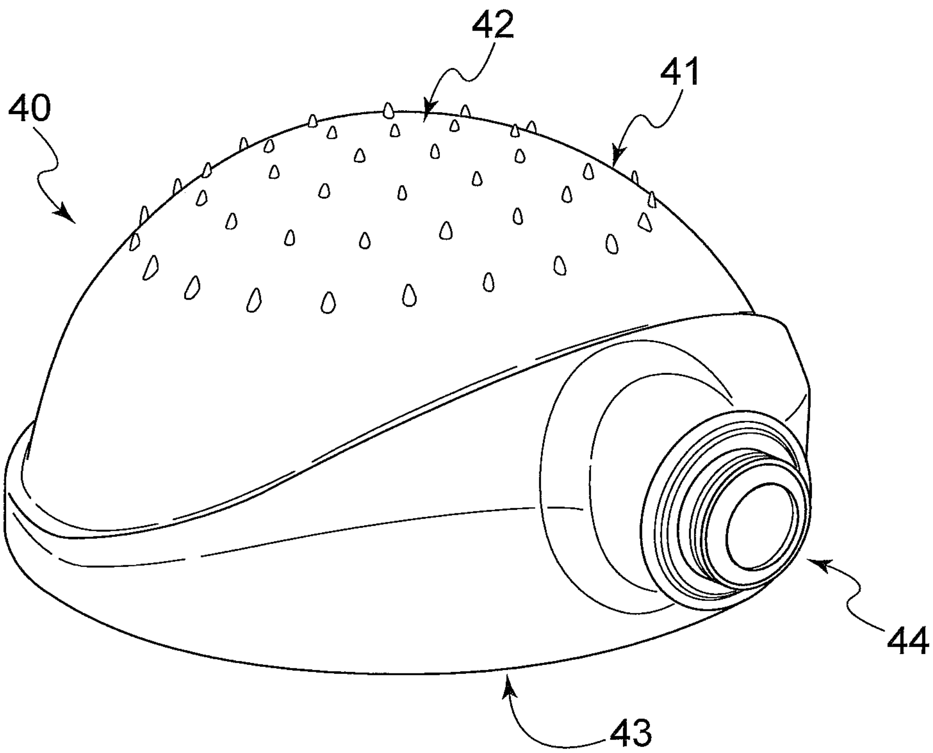
FIG. 4A is a schematic perspective view of the device of the present invention with further and different hidden parts to better highlight others.
Figure 4B:
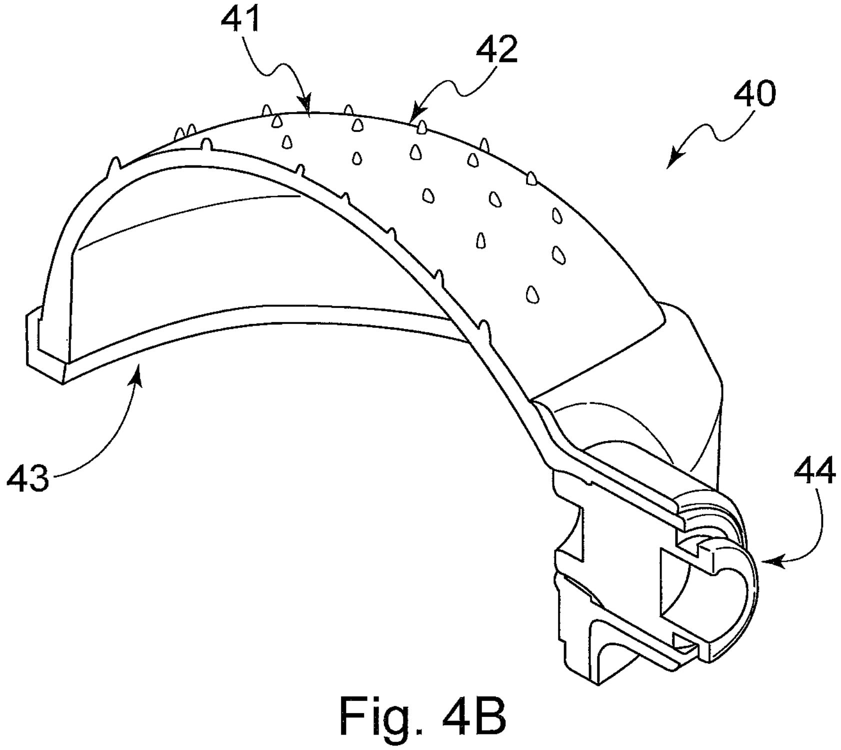
FIG. 4B is a schematic perspective and sectional view of the element of FIG. 4A.

An actuator of this type is schematically depicted by way of example in the FIGS. 4A-4B. Preferably, an actuator of this type can also be used without the assistance of an assigned operator.

According to the present invention, the hemispherical cap actuator has a gripping portion configured for manual gripping and/or fixing to the body of a patient for dispensing the mechanical-sound waves, and a contact portion configured for the contact with the epidermis of the aforesaid patient. At least the gripping portion and the contact portion are made in one piece by overmolding at least one plastic polymer. In a different embodiment according to the present invention, not shown, the gripping portion and the contact portion are made by means of a co-extrusion process.

In further detail, the hemispherical cap actuator has a reversible coupling portion configured for the sealed connection with the aforesaid transmission means of the mechanical-sound waves. Preferably, the reversible coupling portion of the hemispherical cap actuator comprises at least one sealed quick coupling portion suitable for being fitted in the respective portion of the quick coupling present on the free end of the transmission means.

According to the present invention, the device for the non-invasive treatment of muscular pathologies comprises a prismatic actuator configured for a manual application on the muscle and/or epidermis of a patient. Preferably, the prismatic actuator has at least one conical and/or truncated-cone shaped portion and a cylindrical portion, as depicted by way of example in the accompanying FIGS. 6 and 8.

The prismatic actuator comprises a dispensing portion of the mechanical-sound waves and a base portion. Preferably, at the base portion of the actuator, it comprises a reversible coupling portion, for example threaded or mechanically interlocking, to reversibly couple with a further element of the device.

More precisely, the dispensing portion for the prismatic actuator is similar to the contact portion of the aforesaid hemispherical cap dispenser because it is a part of the actuator which goes into contact, at least partially, with an anatomic portion of a patient. Given the difference in the morphology and/or shape and/or size of the prismatic actuator with respect to the hemispherical cap actuator, the contact portion was renamed dispensing portion.

According to the present invention, the device for the non-invasive treatment of muscular pathologies comprises a spoon-like actuator having a concave portion for the manual treatment of the muscle and/or epidermis of a patient in inner anatomic regions, such as for example vaginal applications.

In particular, the concave portion has a planform of the circular or elliptical or oval type. Preferably, the concave portion has a plan development between about 2 and 12 square cm.

Preferably, the spoon-like actuator has a minimum length of at least 7 cm and has an overall thickness or depth of about 2 cm.

According to the inventive concept of the present invention, the present device also comprises a handgrip having, at one end, a sealed quick coupling for the sealingly connection with said transmission means and, at an opposite end, comprising a reversible coupling portion preferably threaded for the sealingly connection with an actuator of the aforementioned type.

Preferably, the handgrip comprises adjusting means configured to adapt the frequency of the mechanical-sound waves depending on the different type of therapy and/or anatomic portion to be treated.

Preferably, the transmission means of said mechanical-sound waves comprise at least one pneumatic tube having, on at least one free end, a quick coupling suitable for being fitted with a respective portion of a reversible coupling with a hemispherical cap actuator or of the handgrip.

In detail, the transmission means comprise at least one pneumatic tube having, on a further free end, a quick coupling suitable for being fitted with a respective sealed quick coupling of the central body of the flow modulator of the device.

In the accompanying FIGS. 1A-1B, the reference number 1 denotes, in the present detailed description, the device 1 for the non-invasive treatment of muscular and neuromuscular pathologies by applying a succession of mechanical-sound waves to a muscle, according to the present invention. More precisely, in FIGS. 1A and 1B, some of the main components of the device 1 are schematically shown while hiding others.

The device 1 of the present invention comprises: production means 20 of the mechanical-sound waves, comprising at least one flow modulator 30 and application means 40 to apply the impulses on the epidermis at a muscle of a patient. The application means 40 are operatively combined with the production means 20, in particular they are connected to each other by transmission means 50 of said mechanical-sound waves. The application means will be further described in detail below.

The production means 20 of the mechanical-sound waves generate mechanical-sound waves with frequency greater than 30 Hz.

The production means 20 of the mechanical-sound waves generate selective square-wave mechanical-sound waves. Conveniently, the device according to the present invention has a control unit to vary the frequency and intensity of the mechanical-sound waves applied to the muscles according to the different type of therapy and/or anatomic portion to be treated.

The control unit is also connected to at least one sensor, not shown in the figures, configured to detect the runtime of the frequency of the mechanical-sound wave generated. This way, whenever the control unit should detect a shift of the frequency generated with respect to the one preset, the control unit would act on the rotor element 70 to adjust its rotation so that to bring the frequency back to the preset value.

The control unit can also have a display configured to display auxiliary images of the portion treated so that to detect the correct positioning of the application means 40.

More in detail, the flow modulator 30 comprises an outer casing 31 inside which a pneumatic chamber 60 is defined and subdivided in a first portion 61 and a second portion 62. The flow modulator 30 further comprises a rotor element 70 arranged between the first 61 and second 62 portions of the pneumatic chamber 60.

In an operating configuration of the device 1, with reference to the accompanying FIG. 1B, the rotor element 70 is rotatable around a symmetry axis "X" of the pneumatic chamber 60 and has an axisymmetric form.

Figure 2A:
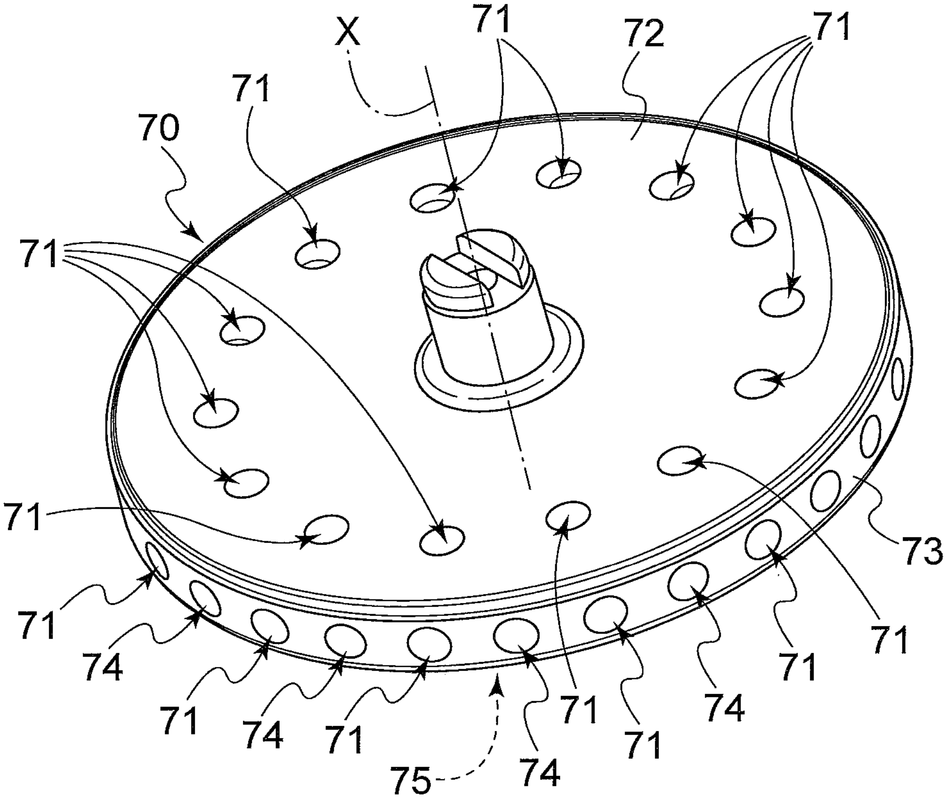
FIG. 2A is a schematic perspective view of the device of the present invention with some hidden parts to better highlight others.
Figure 2B:
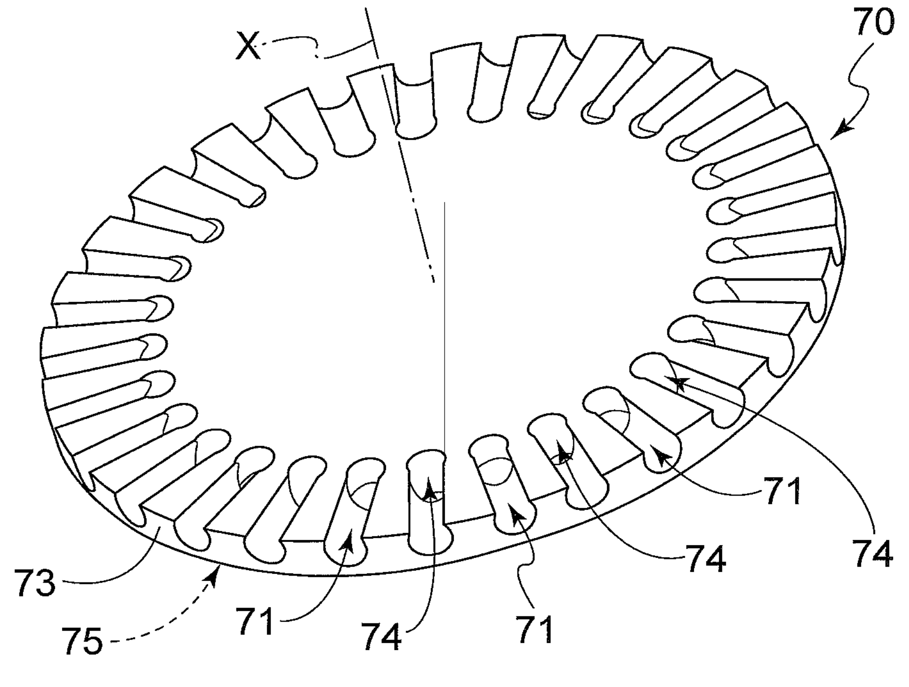
FIG. 2B is a schematic perspective and sectional view of the element of FIG. 2A.

With reference to the FIGS. 2A-2B, the rotor element 70 is preferably disc-shaped and has a first order of passages 71 such as to pass through the rotor 70 from an upper surface 72 until reaching a circular perimetric surface 73. The rotor element 70 further has a second order of passages 74 such as to pass through the rotor 70 itself from a lower surface 75 until reaching the circular perimetric surface 73. Preferably, the first order of passages 71 and the second order of passages 74 alternatively reach the perimetric surface 73 in sequence.

Advantageously, the casing 31 of the flow modulator 30 comprises a central body 32 and an upper cover 33 that can be coupled so as to define the portion 61 of the pneumatic chamber 60 and a lower cover 34 that can be coupled to the aforesaid central body 32 so as to define the second portion 62 of the pneumatic chamber 60.

The central body 32 of the casing has a housing portion 35 configured to at least partially contain the rotor element 70 in an operating configuration of said device 1. In particular, the rotor element 70 is facing the second portion 62 of the pneumatic chamber 60 when it is arranged in the housing portion 35. The configuration described above allows to define the flow modulator 30 of the present invention as a single-chamber flow modulator.

More in detail, with reference to the FIGS. 3A-3B, the central body 32 has a first plurality of passages 36 such as to put the first portion 61 of the pneumatic chamber 60 in fluidic communication with the housing portion 35 and a second plurality of passages 37 at the housing portion 35 such as to put the housing portion 35 in fluidic communication with an outer portion 38 of the central body 32. Preferably, there are at least ten passages 37, more preferably at least fourteen passages 37.

With reference to FIGS. 1A and 1B, the device 1 is such as to have quick couplings 90 of pneumatic type at the second plurality of passages 37 on the outer portion 38 of the central body 32 of the flow modulator 30. Preferably, the aforesaid quick couplings 90 are fluid-tight and such as to isolate the pneumatic chamber 60 from the outside of the casing 31.

By way of example and not limitedly, the quick coupling 90 comprises at least one straight quick coupling portion configured to put two ends of two components and/or passages of the device 1 in fluidic communication. In particular, the quick coupling 90 can comprise a portion adapted to achieve a reversible fluid connection.

In an operating configuration of the device 1, wherein the rotor element 70 is rotating around the axis "X" and is arranged at least partially in the housing portion 35, the rotor element 70 is such as to selectively and alternatively connect the first portion 61 of the pneumatic chamber 60 with the aforesaid outer portion 38 of the central body 32 fluidically by means of the temporary matching of the first plurality of passages 36 of the central body 32 with the first order of passages 71 of the rotor element 70.

In other words, the upper surface 72 of the rotor element 70 is inside and is facing a respective surface of the housing portion 35 of the central body 32. Moreover, the lower surface 75 of the rotor element 70 is facing the second portion 62 of the pneumatic chamber 60 and the circular perimetric surface 73 of the rotor element 70 is facing a corresponding part 35*a* of the housing portion 35.

The number of passages 36-37 of the central body 32 and the number (theoretically corresponding) of passages 71-74 of the rotor element 70 together with the number of revolutions of the rotor element 70 allow to define the frequency of the mechanical-sound waves dispensed by the device 1.

In an operating configuration of the device 1, the first portion 61 of the pneumatic chamber 60 and the second portion 62 of the pneumatic chamber 60 are governed by different pressure values. Preferably, the pressure difference between the first 61 and second 62 portions of the pneumatic chamber 60 is of about 1 bar, even more preferably does not exceed the value of 1 bar.

In order to connect the production means 20 with the application means 40, the transmission means 50 of the mechanical-sound waves comprise at least one pneumatic tube 51 having, at least at one free end, a quick coupling 90 suitable for being fitted with a respective portion of a sealed quick coupling 90 of the application means 40.

In particular, the transmission means 50 comprise at least one pneumatic tube 51 having, on a further free end, a quick coupling 90 suitable for being fitted with a respective sealed quick coupling 90 of the central body 32 of said flow modulator 30.

The application means 40 are described here below. Advantageously, there is a plurality of application means 40 of the mechanical-sound waves. The plurality of the application means 40 of the mechanical-sound waves contemporaneously apply synchronous mechanical-sound waves to muscles.

In particular, in the accompanying FIGS. 4A-4B, an actuator 41 shaped like a hemispherical cap is shown. Preferably, the hemispherical actuator 41 is configured for an automatic application to the muscle and/or epidermis of a patient.

In detail, the hemispherical cap actuator 41 has a gripping portion 42 configured for the manual gripping and/or temporary fixing to dispense the mechanical-sound waves in a predetermined anatomic region of the patient. The hemispherical cap actuator 41 also has a contact portion 43 configured to contact the epidermis of a patient. Advantageously, the gripping portion 42 and the contact portion 43 are made in one piece by overmolding at least one plastic polymer. In particular, the gripping portion 42 is first molded with a predetermined polymer and the contact portion 43 is subsequently overmolded, preferably with a different polymer.

The hemispherical cap actuator 41 has a reversible coupling portion 44 configured for being sealingly connected with the aforesaid transmission means 50 of the mechanical-sound waves, preferably the reversible coupling portion 44 comprises at least one sealed quick coupling portion.

The hemispherical cap actuator 41 of the present invention can have different sizes, it can therefore have different volumes/surfaces in contact with the anatomic part to be treated, just to allow the application thereof at each point of the body without limitations.

According to the present invention, the hemispherical cap actuator 41 has, on an outer surface, prismatic shapes in relief such as to always ensure an optimal grip, both manually and with elastic bands prearranged to hold the actuator 41 in position during the therapeutic treatment.

Figure 6:
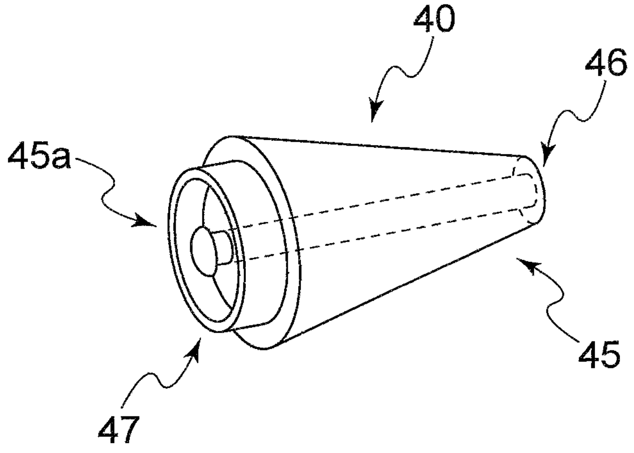
Figure 8:
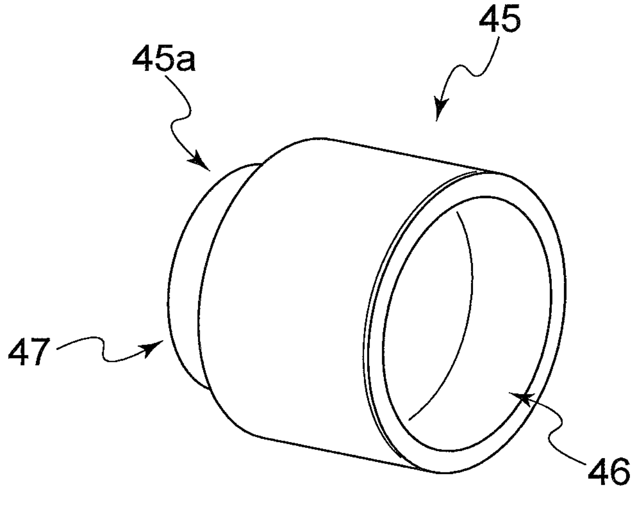

With reference to the accompanying FIGS. 6 and 8, the application means 40 of the present invention comprise a prismatic actuator 45 configured for a manual application to the muscle and/or epidermis of a patient.

According to the present invention, the prismatic actuator 45 comprises a dispensing portion 46 of the mechanical-sound waves and a base portion 47 configured to support said dispensing portion.

More precisely, the dispensing portion 46 for the prismatic actuator 45 is similar to the contact portion 44 of the hemispherical cap dispenser 41 already described previously because it is a part of the actuator 45 which goes into contact, at least partially, with an anatomic portion of a patient. Given the difference in the morphology and/or shape and/or size of the prismatic actuator 45 with respect to the hemispherical cap actuator 41, the contact portion 44 was renamed and denoted as dispensing portion in the following detailed description by the numeral reference 46.

Figure 7:
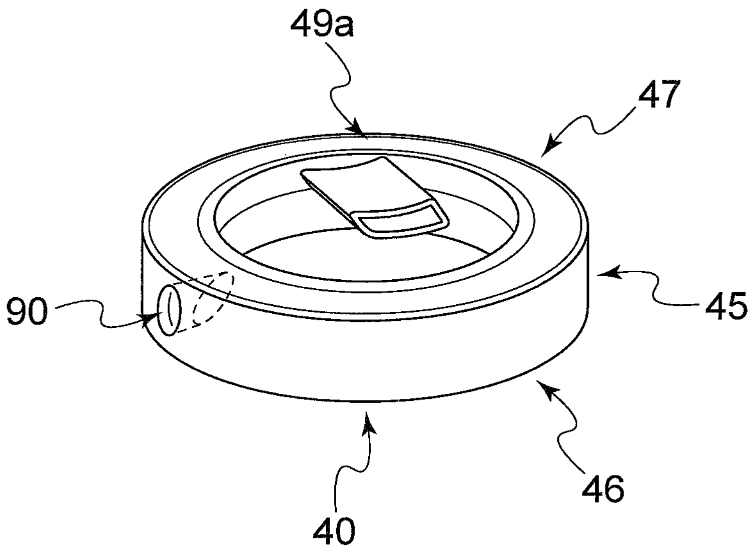

Preferably, the prismatic actuator 45 comprises a reversible quick coupling, for example of the threaded type, as schematically shown in the accompanying FIGS. 6-8.

In particular, the prismatic actuator 45 having at least a conical and/or truncated-cone portion is schematically shown in the accompanying FIG. 6.

Instead, a prismatic actuator 45 configured to dispense a sufficiently large anatomic portion while preserving a dimensional compactness, at least as far as the thickness is concerned, which allows it to be used for example by interposing it between the anatomic part to be treated and a temporary banding, bandages to hold the dispenser in position anyhow allowing a certain movement of the patient, is schematically shown in FIG. 7. More in detail, the transducer of FIG. 7 can be used both like the hemispherical caps in an automatic way, in this case the advantage is that also the back muscles can be treated in the utmost comfort for the patient himself when the patient is in a supine position. In alternative, the transducer 45 of FIG. 7 can be used manually to exert a massage, the grip of the operator is facilitated by an adjustable Velcro ring.

A prismatic actuator 45, which is configured to dispense on a narrower anatomic portion and/or in a more difficult to reach position, is schematically shown in accompanying attached FIG. 8. Preferably, the prismatic actuator 45 depicted in FIG. 6 and FIG. 8 at least has one part of the dispensing portion 46 with a convex or ogival shape, for example with a parabolic-hyperbolic profile. This detail of the shape of the dispensing portion 46 is visible in the actuator 45 of FIG. 8.

Preferably, the prismatic actuator 45 at the base portion 47 comprises a reversible coupling portion 45*a*, for example threaded or mechanically interlocking, configured to couple the actuator 45 to a supporting element better described below.

Figure 9A:
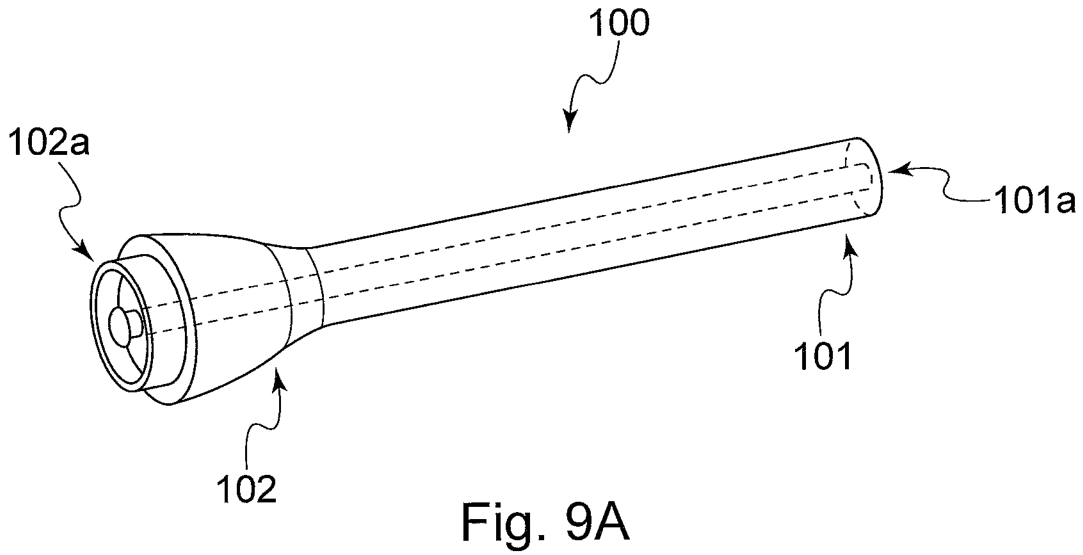
Figure 9B:
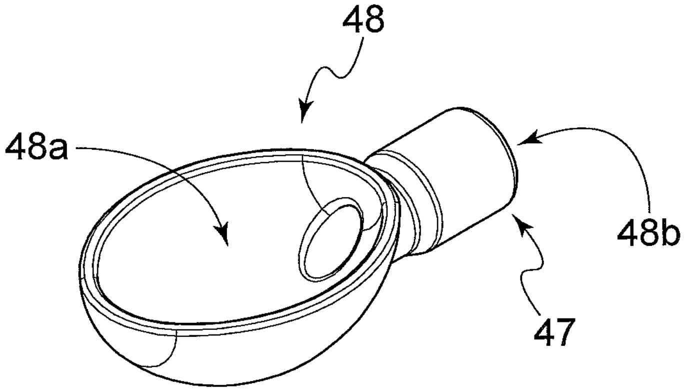
Figure 9C:
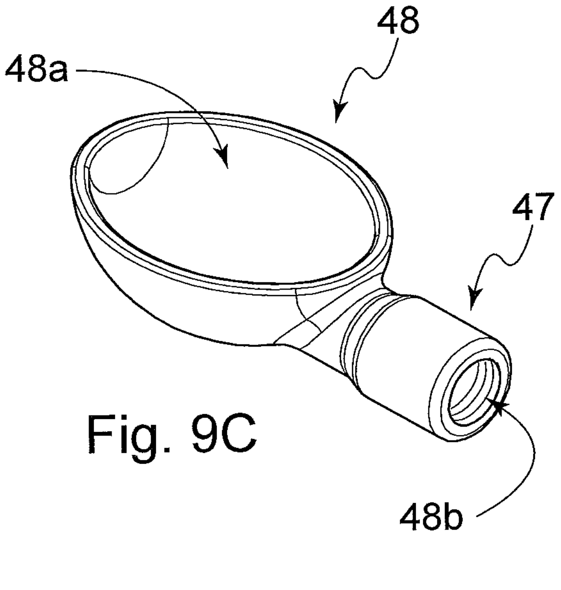

Now, according to the present invention, some components, among which the element of FIGS. 9B and 9C is a spoon-like actuator 48 whereas the component of FIG. 9A is an extension element 100, are schematically shown with reference to FIGS. 9A-9C.

According to the invention, the application means 40 to apply the mechanical-sound waves to the epidermis comprise a spoon-like actuator 48 having a concave portion 48*a*, just like a spoon. The concave portion 48*a* is the part of the spoon-like actuator 48 intended for dispensing the mechanical impulses.

Preferably, the spoon-like actuator 48 is configured for a manual application to the muscle and/or epidermis of a patient, similarly to the actuators 41, 45 described above.

Preferably, the spoon-like actuator 48 is configured for applications to the inner anatomic parts of a patient, such as for example vaginal applications.

Preferably, the concave portion 48*a* has a planform of the circular, elliptical or oval type.

According to the present invention, preferably the concave portion 48*a* has a plan development between about 2 and about 12 square cm.

Preferably, the spoon-like actuator 48 has a minimum length of at least 7 cm and has an overall thickness or depth of about 2 cm.

As schematically shown in the accompanying FIGS. 9B and 9C, the spoon-like actuator 48 has, at a base portion 47, a reversible coupling portion 48*b*, for example a threaded coupling portion.

Now, with reference to the accompanying FIG. 9A, it schematically shows an extension element 100 of elongated shape, such as for example a tube. The extension element 100 is configured to connect with a first free end 101 by means of a reversible coupling portion 101*a* with a respective reversible coupling portion of another actuator, preferably with the reversible coupling portion 48*a* of the aforesaid spoon-like actuator 48.

At a second end 102 opposite of the first one 101, the extension element has a reversible coupling portion 102*a*, for example threaded, suitable for the sealingly connection with the transmission means 50.

In other words, according to the present invention, the spoon-like actuator 48 is advantageously made in two pieces by coupling the extension element 100 with the base part 47.

With reference to the accompanying FIG. 5, the application means 40 to apply the mechanical-sound waves to the epidermis comprise a handgrip 49 having, at an end, a sealed quick coupling 90 to achieve a sealingly connection with the transmission means 50. Preferably, at an opposite end of the handgrip 49, it comprises a reversible coupling portion 49*a*, for example threaded, to achieve a stable sealingly connection with a prismatic actuator 45 (by means of the reversible coupling portion 45*a*), for example the prismatic actuators 45 depicted in FIG. 6 and FIG. 8.

Moreover, the handgrip 49 is configured to achieve a connection with a respective reversible coupling portion 102*a* of the extension element 100 described above.

In other words, the handgrip 49 of the present invention is configured to manually manage the prismatic actuator 45 shown for example in FIG. 6 and FIG. 8 or the spoon-like actuator 48 by means of the extension element 100 interposed between the spoon-like actuator 48 and the handgrip 49 itself.

Preferably, the handgrip 49 comprises adjusting means 80 configured to adapt the frequency of said mechanical-sound waves depending on the different type of therapy and/or anatomic portion to be treated. Preferably, the adjusting means 80 are configured to activate/deactivate the aforesaid impulses, to adjust their frequency and/or amplitude and control all other physical parameters of the vibrational wave. Preferably, the adjusting means 80 comprise a membrane keyboard comprising one or more keys to control and adjust the device 1.

According to the inventive concept of the present invention, the adjusting means 80 are configured to control the operations of the production means 20 of the mechanical-sound waves in an operating configuration of the device 1.

As previously mentioned, the sealed quick coupling 90 allows the passage of fluid, for example between the production means 20 and the application means 40.

Moreover, the sealed quick coupling 90 is configured to be connected to a hybrid coupling 110 depicted by way of example in the accompanying FIG. 10. Therefore, the hybrid coupling 110 can be in fluidic connection with the sealed quick coupling 90 in an operating configuration of the device 1.

In particular, the hybrid coupling 110 is configured to achieve an electrical connection to transmit low voltage information and/or electrically feed for example said adjusting means 80 to allow a communication between the production means 20 and an actuator 45, 48, 100, which are depicted by way of example and not limitedly in the accompanying FIGS. 6, 8, 9A-9C.

Preferably, the hybrid coupling 110 is a hybrid coupling of the panel type.

According to the inventive concept of the present invention, the adjusting means 80 are configured to be connected to a hybrid coupling 120 depicted by way of example and not limitedly in the accompanying FIG. 11. Preferably, the hybrid coupling 120 is a hybrid coupling of the free-hanging type.

The present invention has achieved the preset purposes. Advantageously, the dispensing device of the present invention allows to achieve increased performances in terms of the fluid volume (air) managed by the flow modulator for the benefit of a better quality of the transmitted signal and performance in terms of the intensity of the impulses dispensed with respect to known devices.

Advantageously, the actuators of the present invention are configured such as to allow the connection to the production means by means of a quick coupling. Advantageously, the presence of a quick coupling speeds up and considerably simplifies the maintenance operations and contemporaneously allows to permanently and sealingly stabilize the connection between the tube and dispensing, both in case of automatic dispensing in which the actuator is alongside an anatomic part of a patient by means of banding or binding and in case of an assigned operator who must, for example, replace the elongated end of an actuator during a manual dispensing therapy.

Advantageously, especially in case of therapies using actuators for the anatomic use of the device of the present invention, the patient, during the therapy given by the device, can also be in movement, for example, during a controlled motor activity and/or combined with the non-invasive treatment of muscular and neuromuscular pathologies by applying a succession of mechanical-sound waves to a muscle.

A further advantage derives from the fact that with the quick coupling, it is possible to connect the production means to the dispenser also after the latter was firmly applied to an anatomic part of the patient.

Advantageously, the presence of a quick coupling for the connection between an actuator and the flow modulator allows the device of the present invention to be hygienically cleaner and safer with respect to known devices and allows to considerably soften noises and vibrations of the actuators themselves and of the transmission means.

Advantageously, the two-element structure of the spoon-like actuator with the extension element allows considerable saving of accessories and/or various embodiments with respect to the known devices. In fact, the coupling by means of threading and/or coupling by interference or interlocking between the extension element and/or actuator or handgrip allows to couple, by a sealingly connection without interruption, countless combinations between actuator, extension element and handgrip without requiring a complete set of actuators such as occurs in case of known devices.

Advantageously, the handgrip of the present invention comprising the adjusting means allows the operator to act with one hand only both to orient the actuator on the anatomic part to be treated and to adjust the frequency of the mechanical impulse to transmit thereto.

Advantageously, the gripping portion and the contact portion of an actuator of the present invention are achieved by overmolding the polymers both to allow to considerably speed up the production process and to increase the benefits in terms of hygiene, since there is no more sealing gasket between the two parts which requires systematic maintenance and cleaning in case of the known devices.

Advantageously, the device of the present invention has greater energy efficiency with respect to those of the known type since it makes much less noises and vibrations while operating with respect to those emitted by a device of the same category of the known type.

The invention claimed is:

1. Device for treatment of non-invasive muscular and neuromuscular pathologies by applying a succession of mechanical-sound waves to a muscle, comprising:

a flow modulator of the mechanical-sound waves having a predetermined frequency and a predetermined intensity of mechanical sound-waves;

a mechanical actuator of said mechanical sound-waves for application to an epidermis at said muscle, which are operatively combined with mechanical-sound waves from the flow modulator;

wherein the flow modulator comprises a casing having an outer casing inside which a pneumatic chamber is defined and subdivided in a first portion and in a second portion, and rotor element arranged between the first and the second portions of the pneumatic chamber;

wherein the casing comprises a central body and an upper cover that is coupled so as to define the first portion of said pneumatic chamber and a lower cover that can be coupled to the central body so as to define the second portion of the pneumatic chamber, said rotor element is facing the second portion of the pneumatic chamber, wherein the rotor element is disc-shaped and has a first plurality of passages to pass through the rotor from an upper surface until reaching a circular perimetric surface and a second plurality of passages such as to pass through the rotor from a lower surface until reaching the circular perimetric surface, the first plurality of passages and the second plurality of passages alternatively reaching the perimetric surface in sequence.

2. The device according to claim 1, wherein, in an operating configuration of the device, the rotor element rotates around a symmetry axis (X) of the pneumatic chamber and has an axysimmetric form.

3. The device according to claim 1, wherein the central body has a housing portion configured to contain, at least partially, the rotor element in an operating configuration device.

4. The device according to claim 3, wherein the central body has a first plurality of passages, the first portion of the pneumatic chamber fluidically communicating with the housing portion and a second plurality of passages at the housing portion and the housing portion fluidically communicating with the outer portion of the central body.

5. The device according to claim 4, wherein there is a control unit to vary the frequency and intensity of the mechanical-sound waves applied.

6. The device according to claim 4, wherein the flow modulator of the mechanical-sound waves generate mechanical-sound waves with a frequency greater than 30 Hz.

7. The device according to claim 4, wherein the flow modulator of the mechanical-sound waves generates selective square-wave mechanical-sound waves.

8. The device according to claim 4, further including a plurality of mechanical actuators to impart multiple of the mechanical-sound waves; wherein a plurality of flow modulators of the mechanical-sound waves contemporaneously applying synchronous mechanical-sound waves to the muscle.

9. The device according to claim 4 having quick pneumatic couplings at the second plurality of passages on the outer portion of the central body of the flow modulator.

10. The device according to claim 9, wherein the respective sealed quick coupling is configured for being connected to a hybrid panel coupling and being configured to be connected to a free-hanging hybrid coupling.

11. The device according to claim 3, wherein in an operating configuration, the rotor element, arranged at least partially in the housing portion and rotated selectively and alternatively connects the first portion of the pneumatic chamber to an outer portion of the central body fluidically by temporary matching of the first plurality of passages of the central body with the first plurality of passages of the rotor element.

12. The device according to claim 11, wherein the rotor element selectively and alternatively connects the second portion of the pneumatic chamber fluidically to the outer portion of the central body by temporary matching of the second plurality of passages of the central body with the second plurality of passages of the rotor element.

13. The device according to claim 3, wherein the upper surface of the rotor element is facing the inside of the housing portion of the central body, the lower surface of the rotor element is facing the second portion of the pneumatic chamber and the circular perimetric surface of the rotor element is facing a corresponding part of the housing portion.

14. The device according to claim 1, wherein the first portion of the pneumatic chamber and the second portion of the pneumatic chamber are governed by different pressure values in an operating configuration of the device, the pressure difference between the first and second portions of the pneumatic chamber being of about 1 bar.

15. The device according to claim 1, wherein the mechanical actuator of the mechanical-sound waves on the epidermis comprises an actuator shaped in a shape of a hemispherical cap actuator, the hemispherical cap actuator being configured for an automatic application on the muscle and/or epidermis of a patient.

16. The device according to claim 15, wherein the hemispherical cap actuator has a gripping portion configured for manual gripping and temporary fixing to dispense the mechanical-sound waves and a contact portion configured for coming into contat with the epidermis of the patient, the gripping portion and the contact portion being made in one piece by at least one plastic polymer.

17. The device according to claim 16, wherein the hemispherical cap actuator has a reversible coupling portion configured for being sealingly connected to the mechanical-sound waves, the reversible coupling portion comprising at least one sealed quick-coupling portion.

18. The device according to claim 1, wherein the mechanical actuator of the mechanical-sound waves on the epidermis comprises a prismatic actuator configured for a manual application on the muscle and/or epidermis of a patient, the prismatic actuator having at least one conical and/or truncated-cone shaped portion.

19. The device according to claim 18, wherein the prismatic actuator comprises a dispensing portion to dispense the mechanical-sound waves and a base portion, the base portion the actuator comprising a reversible coupling portion.

20. The device according to claim 1, wherein the mechanical actuator of the mechanical-sound waves on the epidermis comprises a handgrip having, at one end, a sealed quick coupling and, at an opposite end, comprising a reversible coupling portion threaded for a sealing connection with the mechanical actuator.

21. The device according to claim 20, wherein said handgrip comprises adjusting means configured to adapt the frequency of the mechanical-sound waves depending on a different type of therapy and/or anatomic portion to be threaded.

22. The device according to claim 21, wherein the adjusting means is configured to control operation of production of the mechanical-sound waves in an operating configuration of the device.

23. The device according to claim 20, further comprising a transmission of the mechanical-sound waves comprising at least one pneumatic tube having a quick coupling, on at least one fee end, suitable for being fitted with a respective portion of the reversible coupling of the hemispherical cap actuator of the handgrip.

24. The device according to claim 23, the at least one pneumatic tube having, on a further free end thereof, the quick coupling suitable for being fitted with a respective sealed quick coupling of the central body of the flow modulator.

25. The device according to claim 1, wherein the mechanical actuator of the mechanical-sound waves on the epidermis comprises a spoon-shaped actuator having a concave portion, the spoon-shaped actuator being configured for a manual application on the muscle and/or epidermis of a patient.

26. The device according to claim 25, wherein the concave portion has a planform of circular or elliptical shape, the concave portion having a plan development between 2 and 12 square cm.

27. The device according to claim 26, wherein the spoon-shaped actuator has a minimum length of at least 7 cm and a total thickness or depth of about 2 cm.

* * * * *